United States Patent
Hayami et al.

[11] Patent Number: 5,858,540
[45] Date of Patent: Jan. 12, 1999

[54] FLUORORESIN COMPOSITIONS, HEAT-SHRINKABLE TUBINGS AND INSULATED WIRES EMPLOYING THE FLUORORESIN COMPOSITIONS

[75] Inventors: Hiroshi Hayami; Takashi Kakihara, both of Osaka, Japan

[73] Assignee: Sumitomo Electric Industries, Ltd., Osaka, Japan

[21] Appl. No.: 927,495

[22] Filed: Sep. 11, 1997

Related U.S. Application Data

[63] Continuation of Ser. No. 583,914, Jan. 11, 1996, abandoned.

[30] Foreign Application Priority Data

| Jan. 12, 1995 | [JP] | Japan | 7-003517 |
| Oct. 3, 1995 | [JP] | Japan | 7-256535 |

[51] Int. Cl.$^6$ .............. B32B 27/00; D02G 3/00
[52] U.S. Cl. .......... 428/421; 428/422; 525/193; 525/194; 525/199
[58] Field of Search ............... 525/193, 194, 525/199; 428/421, 422

[56] References Cited

U.S. PATENT DOCUMENTS

| 4,489,113 | 12/1984 | Ueno | 428/36 |
| 4,960,624 | 10/1990 | Ueno | 428/35.1 |
| 5,013,792 | 5/1991 | Chapman, Jr. et al. | 525/166 |
| 5,057,575 | 10/1991 | Chapman, Jr. et al. | 525/199 |
| 5,275,887 | 1/1994 | Johnson et al. | 428/422 |

FOREIGN PATENT DOCUMENTS

| 444700A2 | 9/1991 | European Pat. Off. |
| 07033938 | 2/1995 | Japan. |
| WO8706597 | 11/1987 | WIPO. |
| WO8807063 | 9/1988 | WIPO. |

*Primary Examiner*—Newton Edwards
*Assistant Examiner*—J. M. Gray
*Attorney, Agent, or Firm*—Roylance,Abrams,Berdo & Goodman, L.L.P.

[57] ABSTRACT

A fluororesin composition is disclosed which includes vinylidene fluoride, tetrafluoroethylene and hexafluoropropylene copolymerized in a specific proportional ratio and a multifunctional monomer as an auxiliary cross-linking agent. The composition may optionally include an organic phosphite or a light stabilizer in a predetermined proportion. A heat-shrinkable tubing made from the fluororesin composition and an insulated wire incorporating an insulation layer or an insulating coating comprised of the fluororesin composition are further disclosed.

22 Claims, 1 Drawing Sheet

FLUORORESIN COMPOSITIONS, HEAT-SHRINKABLE TUBINGS AND INSULATED WIRES EMPLOYING THE FLUORORESIN COMPOSITIONS

This application is a continuation of application Ser. No. 08/583,914, filed Jan. 11, 1996, now abandoned.

BACKGROUND OF THE INVENTION

1. Technical Field

This invention relates to novel fluororesin compositions, heat-shrinkable tubings and insulated wires employing such fluororesin compositions.

2. Description of Related Art

Fluororesins such as polytetrafluoroethylene (PTFE), tetrafluoroethylene-perfluoroalkylvinylether copolymer (PFA) and the like are known materials for heat-shrinkable tubings and coverings for insulated wires in those applications where highly heat-resistant properties are required.

The temperature ratings of PTFE and PFA referring to the UL index, are higher than 200° C., so that these polymers show excellent heat-resistances. For instance, the changes of their mechanical properties such as tensile strength and elongation are very small even after the heat-aging in a Geer oven maintained at 260° C. for 96 hours. In addition, heat-shrinkable tubings comprised of PTFE and PFA provide another advantage on account of their high transparency, in which the inside of the covered portion can be easily inspected when these heat-shrinkable tubings are used as a wire connection or joint.

However, PTFE and PFA are rather rigid, so that they tend to buckle when bent forcibly. Therefore the heat-shrinkable tubings and the insulated wires comprised of these polymers are not suitable for the narrow space wirings.

The radiation cross-linked fluorinated elastomers including known vinylidene fluoride based bipolymers or terpolymers such as vinylidene fluoride-hexafluoropropylene copolymer or vinylidene fluoride-hexafluoropropylene-tetrafluoroethylene copolymer and the like, have good flexibility as well as excellent heat resistance, i.e., the operating temperatures higher than 200° C. as similar to those of PTFE and PFA.

The heat-shrinkable tubings are generally manufactured as follows.

For instance, a tubular article which has been produced by an extruding method is cross-linked such as by ionizing irradiation. The cross-linked tubular article is radially expanded under a heated condition and then rapidly cooled to maintain its expanded shape. The heat-shrinkable tubings are required to maintain their expanded shapes before use, and this property is generally referred to as heat-settability.

However, the above-described cross-linked fluorinated elastomer tubings do not have enough heat-settability, i.e., ability to maintain their expanded shapes, so that those expanded fluorinated elastomer tubings shrink spontaneously at room temperature and lose their heat-shrinkabilities.

In order to improve the heat-settability of the fluorinated elastomer tubing, fluorinated polymers which have crystallinity such as a crystalline polyvinylidene fluoride are blended to the fluorinated elastomer. However this lowers the transparency of the tubing.

Furthermore, the fluorinated elastomers tend to tear against an external stress when they are applied as an insulation layer of an electrical wire.

Accordingly, it is an object of the present invention to provide novel fluororesin compositions.

It is another object of the present invention to provide a heat-shrinkable tube comprised of such fluororesin compositions which is highly tranparant and has excellent heat-resistance, flexibility and heat-settability.

Yet another object of the present invention is to provide an insulated wire incorporating an insulating covering or coating comprised of such fluororesin compositions which the covering or coating has excellent tear-resistance, heat-resistance and flexibility.

SUMMARY OF THE INVENTION

In accordance with the present invention, a fluororesin composition is provided which includes 100 parts by weight of a terpolymer having three respective repetitive units of vinylidene fluoride, tetrafluoroethylene and hexafluoropropylene, and 0.1–10 parts by weight of a multifunctional monomer having two or more carbon-carbon unsaturated bonds in the molecule. The terpolymer comprises 30–50 mole % of the vinylidene fluoride, 30–50 mole % of the tetrafluoroethylene and 10–30 mole % of the hexafluoropropylene.

The fluororesin composition may further include 0.1–1 parts by weight of an organic phosphite or a selected amount of a light stabilizer, with respect to 100 parts by weight of the terpolymer, which improves the heat-aging resistance of the resin composition without decreasing its transparency. The light stabilizer may be incorporated in a range of 0.05–5 parts by weight, preferably 0.1–1.0 parts by weight. In a particular embodiment, the light stabilizer comprised of a hindered amine based compound enables a noticeable improvement upon heat-aging resistance of the fluororesin composition.

The present invention further provides a heat-shrinkable tubing comprised of the present fluororesin composition. In a particular embodiment of the present invention, an extruded tubular article comprised of such fluororesin composition is exposed to ionizing radiation to crosslink the fluororesin composition. The crosslinked tube is then radially expanded under a heated condition and thereafter rapidly cooled maintaining the expanded shape, so that the heat-shrinkability is provided to the tubing.

The present invention also provides an insulated wire obtained by coating a fluororesin composition on a conductor and then irradiating the resin composition coating with ionizing radiation. The fluororesin composition includes 100 parts by weight of a terpolymer having three respective repetitive units of vinylidene fluoride, tetrafluoroethylene and hexafluoro-propylene, and 0.1–10 parts by weight of a multifunctional monomer having two or more carbon-carbon unsaturated bonds in the molecule. The terpolymer comprises 30–50 mole % of the vinylidene fluoride, 30–50 mole % of the tetrafluoroethylene and 10–30 mole % of the hexafluoropropylene.

BRIEF DESCRIPTION OF THE DRAWINGS

These and other objects, features, aspects and advantages of the present invention will become more fully apparent from the following detailed description of the present invention when taken in conjunction with the accompanying drawings, in which.

DETAILED DESCRIPTION OF THE PREFERRED EMBODIMENTS

Figure 1:
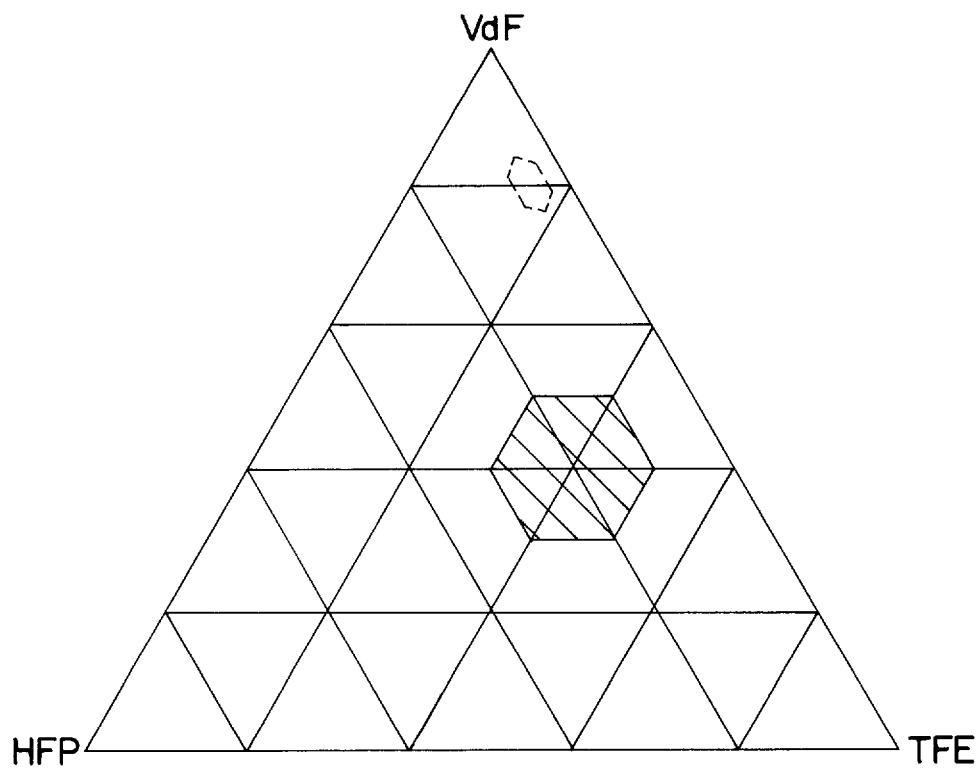
FIG. 1 is a monomer composition diagram of a terpolymer illustrating a preferable monomer composition range incorporated in the terpolymer of the present invention.

Fluororesin compositions of the present invention will now be explained.

Terpolymers for use in the fluororesin compositions of the present invention have three different repititive monomer units of vinylidene fluoride, tetrafluoroethylene and hexafluoro-propylene, with their ratio being within a preferred limited range as described above. Specifically, the ratio of the three repititive units is selected from values on solid lines describing a hexagon as shown in a monomer composition diagram of FIG. 1 and within an area bounded by the solid lines. The area is shown by slant lines in the diagram.

The reason why the terpolymer has such a preferable composition range may be explained as follows.

Vinylidene fluoride contents influence heat-resistance of such terpolymers. When the vinylidene fluoride content of the terpolymer is either less than 30 mole % or greater than 50 mole %, a heat-aging resistance of the terpolymer falls down so that a cross-linked, heat-shrinkable tubing or a covering material of an insulated wire each comprised of the terpolymer tends to lose its original properties within a relatively short time period.

A preferable vinylidene fluoride content is about 40 mole % in light of heat-resistances of the cross-linked heat-shrinkable tubing and the insulation layer of the insulated wire.

Tetrafluoroethylene content influences crystallinity of the terpolymer which relates to the heat-settability of the cross-linked heat-shrinkable tubing and the tear-resistance of the insulation layer. When the tetrafluoroethylene content of the terpolymer is less than 30 mole %, the terpolymer loses its crystalline contents with the result that the cross-linked heat-shrinkable tube made therefrom does not have sufficient heat-settability and the insulating covering made therefrom tends to tear responsive to an external stress.

On the other hand, when the tetrafluoroethylene content of the terpolymer exceeds 50 mole %, the respective contents of the other two components fall short of their respective specified ranges so that a heat-aging resistance, transparency and flexibility of the terpolymer are respectively lowered. The deterioration of the heat-aging resistance causes the degradation of the cross-linked heat-shrinkable tubing and the insulation layer within a relatively short time period. The reduced flexibility prevents their application to a local wiring.

A preferable tetrafluoroethylene content is about 40 mole % in view of a proper balance of the above-described three characteristics.

Hexafluoropropylene contents influence flexibility of the cross-linked heat-shrinkable tube and the insulating covering. When the content is less than 10 mole %, the flexibility of the cross-linked heat-shrinkable tube and the insulating covering is reduced to prevent their application to the local wiring.

On the other hand, when the hexafluoropropylene content of the terpolymer exceeds 30 mole %, the respective contents of the other two components fall short of their respective specified ranges, and the heat-aging resistance and/or crystallinity thereof are reduced. The reduction of the heat-aging resistance causes the degradation of the cross-linked heat-shrinkable tubing and the insulation layer within a relatively short time period. The reduction of crystallinity leads to a reduction in the heat-settability of the heat-shrinkable tubing and the tear resistance of the insulation layer against an external stress.

A preferable hexafluoropropylene content is about 20 mole % in view of the proper balance of the above-described three respective characteristics.

Terpolymers having a selected ratio of the respective contents of vinylidene fluoride, tetra-fluoroethylene and hexafluoro-propylene within the above-specified range are observed to have melting points ranging from about 100° C. to 180° C. and quantities of heat of fusion ranging from about −1.0 J/g to −20 J/g both for their crystallinity when measured by a differential scanning calorimetry (DSC method). The terpolymers are also shown to have excellent properties as described above and suitable degrees of crystallinity.

Any particular limitation is not given to an average molecular weight range of the above terpolymers. However, the terpolymers having higher average molecular weights tend to exhibit the lower flowability in their melting state. This, for example, slows down an extrusion speed when the heat-shrinkable tubing or the insulation layer is produced by the extrusion-molding, thereby possibly preventing productivity thereof from reaching to a practical level.

In order to obtain the productivity of practical level, the average molecular weights of the terpolymers may be preferably adjusted so that their melt flow properties (190° C., 2160 g load), indicative of flowability in a melting state, come within about 0.1–30.

The fluororesin composition comprised of only the terpolymers as above described does not achieve the heat-aging resistance of 200° C. or higher temperature rating, even when it is exposed to ionizing radiation. For example, when a sheet having a thickness of 1.0 mm molded from the above-described terpolymer is exposed to electron beam radiation of 50–300 kGy at acceleration voltage of 2 Mev and is subsequently placed in a Geer oven at 260° C., the molded sheet melts and completely loses its original shape.

While a heat-shrinkable tubing manufactured solely from the above-described terpolymers is thermally expandable in its radial direction and is able to maintain its heat-settability, the tubing disadvantageously lacks a sufficient level of heat-shrinkability so that its radius does not return to an initial dimension prior to its thermal expansion.

In an effort to avoid such problems, the fluororesin composition of the present invention contains a multi-functional monomer in a range of 0.1–10 parts by weight with respect to 100 parts by weight of the terpolymer. The multi-functional monomer serves as an auxiliary cross-linking agent in the crosslinking of the terpolymer using the ionizing radiation.

When the multifunctional monomer content is less than 0.1 parts by weight, the terpolymer may still not be crosslinked sufficient to have a high heat-resistance, i.e., an operating temperature of 200° C. and higher. A sufficient heat-shrinkability is not achievable in a heat-shrinkable tubing comprised of such terpolymer.

On the other hand, when the multifunctional monomer content exceeds 10 parts by weight, a further crosslinking is not expected while an excessive amount of multifunctional monomer tends to undesirably cause bleeding.

A preferable content of the multifunctional monomer is 1–10 parts by weight, which is considered to achieve a sufficient amount of crosslinking of the terpolymer.

The multifunctional monomer may comprise various compounds which have two or more of carbon-carbon unsaturated bonds. Illustrative of the multifunctional monomers are triallylcyanurate, triallylisocyanurate, ethylene glycol dimethacrylate, trimethylolpropane trimethacrylate, tetramethylolpropane tetraacrylate, and the like. A preferred compound employed by the present invention is trimethylolpropane-trimethacrylate for the reason of developing less color when exposed to ionizing radiation for crosslinking.

The fluororesin composition of the present invention may further comprise an organic phosphite and/or a light stabilizer which serve to further improve heat-aging resistance of the heat-shrinkable tubing and the insulation layer. In particular, the addition of a hindered amine based compound as the light stabilizer enables a noticeable enhancement of heat-aging resistance of the fluororesin composition.

The organic phosphite content is preferably limited within a range of 0.1–1 parts by weight with respect to 100 parts by weight of the terpolymer.

When the organic phosphite content is less than 0.1 parts by weight, the addition thereof is not able to contribute to a sufficient enhancement of the heat-aging resistance. On the other hand, when the organic phosphite content exceeds 1 parts by weight, a further enhancement of the heat-aging resistance is not expected while, for example, the transparency of the heat-shrinkable tubing undesirably drops.

The preferred content of the organic phosphite is about 0.5 parts by weight from the compatibility of the heat-aging resistance enhancement and the transparency maintenance.

The organic phosphite may include, for example, bis(2, 6-di-tert-butyl-4-phenylmethyl)pentaerythritol-di-phosphite, distearylpentaerythritol-di-phosphite, bis(2,6-di-tert-buthyl-4-phenyl)pentaerythritol-di-phosphite, and the like.

The content of the light stabilizer may be preferably in a range of 0.05–5 parts by weight, more preferably in a range of 0.1–1 parts by weight, with respect to 100 parts by weight of the terpolymer.

When the light stabilizer content is less than 0.05 parts by weight, the addition thereof is not likely to suffice to enhance the heat-aging resistance. On the other hand, when the light stabilizer content exceeds 5 parts by weight, a further enhancement of the heat-aging resistance is not expected while, for example, the transparency of the heat-shrinkable tubing comprised of the fluororesin composition undesirably drops.

Illustrative light stabilizers include benzophenone compounds such as 2, 2-dihydroxy-4-methoxybenzophenone, benzotriazole compounds such as 2, 2-methylenebis[4-(1, 1, 3,3-tetramethylbutyl)-6-(2H-benzotriazole-2-yl)phenol (hereinafter referred to as BTAZ1), oxalic acid anilide compounds such as 2-ethoxy-2-ethyl-oxalic acid bisanilide, and hindered amine compounds such as poly[{6-1, 1, 3, 3-tetramethylbuthyl)amino-1, 3, 5-triazine-2, 4-diyl}{(2, 2, 6, 6-tetramethyl-4-piperidyl)imino}hexamethylene{(2, 2,6, 6-tetramethyl-4-piperidyl)imino}] (hereinafter referred to as HALS1), tetrakis(2, 2, 6, 6-tetramethyl-4-piperidyl)-1, 2, 3, 4-butanetetracarboxylate (hereinafter referred to as HALS2) and the like. In particular, the hindered amine based compounds may be preferably employed for their capability of noticeably enhancing the heat-aging resistance.

In the event that a high degree of transparency is not required for the insulation layer or the insulating coating of the insulated wire, the fluororesin composition of the present invention may further comprise a vulcanization accelerator such as zinc oxide (zinc white), or an inorganic acid-accepting agent such as magnesium oxide, calcium hydroxide and the like for controlling the evolution of hydrofluoric acid which undesirably acts to corrode a conductor. The suitable amounts of the vulcanization accelerator and the acid-accepting agent for the above purposes are known in the art.

The fluororesin composition may further comprise additives such as various stabilizers as known in the art.

The fluororesin composition of the present invention can be prepared by mixing the above-described components, for example, by means of known equipments including an open roll mixer, a banbury mixer, a pressure kneader, a twin-screw extruder and the like.

The fluororesin composition of the present invention may be pelletized such as by a pelletizer to provide for the manufacture of the heat-shrinkable tubings or the insulation layers of the insulated wires.

The heat-shrinkable tubing of the present invention will now be explained.

The heat-shrinkable tubing of the present invention may be manufactured in the manner as known in the art except the fluororesin compositions of the present invention are employed. Any particular limitation is not added to its internal diameter and thickness. The tubing may be sized to meet standards on heat-shrinkable tubings or insulated wires.

The heat-shrinkable tubing of the present invention can be manufactured first by molding the fluororesin composition to form a tubing having a specified internal diameter which is designed for the one after heat-shrinkage of the tubing, using a known molding process such as extrusion molding.

The molded tubing is subsequently exposed to an accelerated electron beam at about 30–200 kGy, preferably about 50–100 kGy so that the terpolymer is crosslinked.

The crosslinked tubing is heated to a temperature above a melting point of the terpolymer, thermally-expanded to a predetermined diameter such as by introducing a compressed air into a tube bore and rapidly cooled so that the heat-shrinkable tubing of the present invention is manufactured.

The thus manufactured heat-shrinkable tubing of the present invention has an excellent heat-shrinkability, and heat-shrinks when reheated to a temperature above the melting point of the terpolymer thereby to tightly surround or cover a wire joint and the like. In addition, the heat-shrinkable tubing of the present invention has an excellent heat-settability which eliminates possibility of the tubing to spontaneously shrink at room temperature. Furthermore, the heat-shrinkable tubing of the present invention has excellent heat-aging resistance, flexibility and transparency.

The insulated wire of the present invention will now be explained.

The insulated wire of the present invention is comprised of a conductor and an insulation layer or a coating formed on the conductor.

Any known conductor materials may be used for the above conductor. Examples of the conductor include copper, annealed copper, silver, nickel-plated annealed copper, tin-plated annealed copper and the like.

The insulated wire of the present invention can be manufactured first by coating the fluororesin composition onto the conductor, using a known molding process such as extrusion molding.

The fluororesin composition coated on the conductor is subsequently exposed to an accelerated electron beam at about 30–200 kGy, preferably about 50–100 kGy to crosslink the terpolymer so that an insulation layer is formed around the conductor.

Any particular limitation is not added to a thickness of the insulation layer. The thickness of the insulation layer may be dimensioned to meet standards on insulated wires and the like.

The insulated wire of the present invention is highly tear-resistance against an external stress and has excellent heat-resistance and flexibility.

Japanese Kokai Patent No. Hei 2-59325 discloses a heat-shrinkable tubing, as similar to the present heat-shrinkable tubing, wherein a terpolymer comprising 65–75 parts by weight of vinylidene fluoride, 15–25 parts by weight of tetrafluoroethylene and 5–15 parts by weight of hexafluoropropylene is crosslinked by reacting it with a specific multifunctional monomer to form the heat-shrinkable tubing.

However, the conversion of the disclosed ratios in weight part of the respective components of the terpolymer to the corresponding ratios by mole % indicates that the disclosed terpolymer compositions fall within an area as bounded by dotted lines in FIG. 1. Such an area is widely spaced apart from the area in accordance with the present invention in the diagram of FIG. 1.

The terpolymer as employed in the present fluororesin composition, heat-shrinkable tubing and insulated wire contains, in particular, a smaller amount of vinylidene fluoride than the terpolymer as employed in the above publication to an extent that the heat-aging resistance of the present terpolymer is superior to that of the terpolymer as disclosed in the publication. Such a difference will become apparent from the results of examples of the present invention and comparative examples as described hereinafter.

EXAMPLES

The present invention will now be explained with reference to the following Examples and Comparative Examples.

Heat-shrinkable Tubing

Example 1

100 parts by weight of terpolymer THV200G (designation used in trade and manufactured by Sumitomo 3M; melting point: 124° C.; heat of fusion (DSC method):–5.4 J/g) which comprises about 40 mole % of vinyldine fluoride, about 40 mole % of tetrafluoroethylene and about 20 mole % of hexafluoropropylene and 1 part by weight of trimethylolpropanetrimethacrylate as a multifunctional monomer were mixed and kneaded by a known two-roll mixer maintained at 160°–180° C. to obtain a fluororesin composition.

The fluororesin composition was then pelletized by a pelletizer to form a pellet. The pellet was melt-extruded under the extrusion temperature of 200° C., using a single screw melt-extruder (30 mmΦ, L/D=24) to form a tubing having an internal diameter of 4.0 mmΦ and a wall thickness of 0.3 mm. The tubing was subsequently exposed to an electron beam radiation with a dose of 50 kGy and with an acceleration voltage of 2 MeV to crosslink.

The crosslinked tubing was at its one end closed and at its another end connected to a compressed air line, followed by immersion in a constant temperature bath set at 160° C. A compressed air was introduced through the line to expand the tubing till its internal diameter reaches 8.0 mmΦ. Immediately thereafter, the tubing was taken out from the bath and was cooled in water, for the purpose of providing the tubing with heat-shrinkability, to obtain a heat-shrinkable tubing of Example 1.

Example 2

A heat-shrinkable tubing of Example 2 was obtained in the similar manner as in Example 1 except 2 parts by weight of triallylisocyanurate was mixed as an alternative multifunctional monomer to trimethylolpropanetrimethacrylate and the dose of the electron beam radiation was increased to 100 kGy.

Example 3

A heat-shrinkable tubing of Example 3 was obtained in the similar manner as in Example 1 except 2 parts by weight of triallylisocyanurate was mixed as an alternative multifunctional monomer to trimethylolpropanetrimethacrylate, 0.5 parts by weight of distearylpentaerythritol-di-phosphite as an organic phosphite further added, and the dose of the electron beam radiation was increased to 100 kGy.

Comparative Example 1

A heat-shrinkable tubing of Comparative Example 1 was obtained in the similar manner as in Example 1 except the same raw pellet of terpolymer as used in Example 1 was introduced to an extruder in the absence of the multifunctional monomer and the dose of the electron beam radiation was increased to 100 kGy.

Comparative Example 1—1

A heat-shrinkable tubing of Comparative Example 1—1 was obtained in the similar manner as in Comparative Example 1 except the dose of the electron beam radiation was increased to 250 kGy.

Comparative Example 2

A heat-shrinkable tubing of Comparative Example 2 was obtained in the similar manner as in Example 1 except 100 parts by weight of terpolymer THV500G (designation used in trade and manufactured by Sumitomo 3M; melting point: 168° C.; heat of fusion (DSC method):–10.9 J/g) which comprises about 20 mole % of vinyldine fluoride, about 60 mole % of tetrafluoro-ethylene and about 20 mole % of hexafluoropropylene was employed as a substitute of terpolymer THV200G in Example 1, the addition of trimethylolpropanetrimethacrylate as a multifunctional monomer increased to 2 parts by weight and the dose of the electron beam radiation increased to 100 kGy.

Comparative Example 3

A heat-shrinkable tubing of Comparative Example 3 was manufactured in the similar manner as in Example 1 except 100 parts by weight of a bipolymer KYNER7201 (designation in trade and manufactured by Mitsubishi Petrochemical Co,; melting point: 121° C.) which comprises about 50 mole % of vinyldine fluoride and about 50 mole % of tetrafluoroethylene was employed as a substitute of terpolymer THV200G as employed in Example 1, the addition of trimethylolpropanetrimethacrylate as a multifunctional monomer increased to 2 parts by weight and the dose of the electron beam radiation increased to 100 kGy.

Comparative Example 4

A crosslinked tubing of Comparative Example 4 was obtained in the similar manner as in Example 1 except 100 parts by weight of terpolymer (a fluorinated elastomer FLOREL 2430 designated in trade and manufactured by Sumitomo 3M) which comprises about 40 mole % of vinyldine fluoride, about 25 mole % of tetrafluoroethylene and about 35 mole % of hexafluoropropylene was employed as a substitute of terpolymer THV200G in Example 1, the addition of trimethylolpropanetrimethacrylate as a multifunctional monomer increased to 2 parts by weight, both of the two components kneaded by an open roll mixer at room temperature and the dose of the electron beam radiation increased to 100 kGy. While an attempt to manufacture a heat-shrinkable tubing from the crosslinked tubing was made using the same condition as used in Example 1, a suitable heat-settability was not given to the crosslinked tubing of Comparative Example 4 so that it spontaneously shrunk to its initial dimension when removed from the constant temperature bath and subsequently cooled in water.

Comparative Example 5

A heat-shrinkable tubing of Comparative Example 5 was manufactured in the similar manner as in Example 1 except 100 parts by weight of a terpolymer KYNER9301 (designation in trade and manufactured by Mitsubishi Petrochemical Co,; melting point: 91.2° C.) which comprises about 70 wt. % of vinyldine fluoride, about 20 wt. % of tetrafluoroethylene and about 10 wt. % of hexafluoropropylene was employed as a substitute of terpolymer THV200G in Example 1.

For the purposes of evaluating the properties of the respective heat-shrinkable tubings of Examples and Comparative Examples, they were subjected to the following tests.

Heat-Settabililty Test

The heat-shrinkable tubings were left to stand at room temperature for about one day, and thereafter an internal diameter of each of those tubings was measured. The heat-shrinkable tubings which exhibited no diameter chanege were evaluated as being good (ζ). The heat-shrinkable tubings which exhibited slight diameter changes within a serviceable range were evaluated as being fair (Δ). A poor (X) evaluation was given to the crosslinked tubing of Comparative Example 4 which was not feasible for a heat-shrinkable tubing.

Heat-shrinkability Test

An alumunium rod having an external diameter of 6 mmΦ was inserted into each of the heat-shrinkable tubings of Examples and Comparative Examples which was subsequently immersed in a constant temperature bath set at 160° C. and then removed from the bath in one minute. The heat-shrinkable tubing which heat-shrunk sufficient to tightly surround the inside aluminum rod was evaluated as being good (ζ). The heat-shrinkable tubing which failed to heat-shrink or shrunk insufficient to tightly surround the aluminum rod was evaluated as being poor (X).

Visible Light Transmission Measurements

An average transmission of visible light having a wavelength range of 400–800 nm was measured in each of the heat-shrinkable tubings of Examples and Comparative Examples, using a spectrophotometer.

Initial Physical Properties Test

In the course of manufacturing a heat-shrinkable tubing in each of Examples and Comparative Examples, an EB-irradiated crosslinked tubing was cut prior to its thermal expansion to prepare specimens of 100 mm long. A tensile strength ($kg/mm^2$) and an ultimate elongation (%) were measured for each of these specimens from each of Examples and Comparative Examples in accordance with standard test methods as described in Section 3 [Tensile Tests] of JIS K 6301 [Physical Testing Methods For Vulcanized Rubber]. Also, for the purpose of flexibility evaluation, a modulus at 2% elongation was measured for each of the specimens. The value of modulus was multiplied by 50 to give a secant modulus ($kg/mm^2$).

Post-heat-age Physical Properties Test I

Specimens prepared in the same manner as in the above Physical Properties Test were heat-aged in Geer oven maintained at 260° C. for 96 hours, wherein all the specimens from Comparative Example 1 melt and were unable to proceed to further measurements. A tensile strength ($kg/mm^2$) and an ultimate elongation (%) were measured for each of the heat-aged specimens in the same manner as in the above Physical Properties Test.

The results were given in the following Tables 1–3. In the Tables, TMPT and TAIC represents trimethylolpropane-trimethacrylate and triallylisocyanurate, respectively.

TABLE 1

|  | EXAMPLE1 | EXAMPLE2 | EXAMPLE3 |
|---|---|---|---|
| Multifunctional monomer |  |  |  |
| Type | TMPT | TAIC | TAIC |
| Parts by weight | 1 | 2 | 2 |
| Organic phosphite | — | — | 0.5 |
| Dose of electron beam radiation(kGy) | 50 | 100 | 100 |
| Heat-settability | ○ | ○ | ○ |
| Heat-shrinkability | ○ | ○ | ○ |
| Visible light transmission(%) | 88.6 | 84.6 | 88.5 |
| Initial physical properties |  |  |  |
| Tensile strength($kg/mm^2$) | 2.8 | 2.6 | 2.8 |
| Ultimate elongation(%) | 420 | 310 | 390 |
| Secant modulus($kg/mm^2$) | 7.9 | 8.4 | 8.1 |
| Post-heat-age physical properties I |  |  |  |
| Tensile strength($kg/mm^2$) | 1.8 | 2.0 | 2.7 |
| Ultimate elongation(%) | 360 | 270 | 390 |

TABLE 2

|  | COMP. EXP.1 | COMP. EXP.1-1 | COMP. EXP.2 |
|---|---|---|---|
| Multifunctional monomer |  |  |  |
| Type | — | — | TMPT |
| Parts by weight | — | — | 2 |
| Dose of electron beam radiation(kGy) | 100 | 250 | 100 |
| Heat-settability | ○ | ○ | — |
| Heat-shrinkability | X | X | — |
| Visible light transmission(%) | 88.8 | 86.3 | 41.3 |
| Initial physical properties |  |  |  |
| Tensile strength($kg/mm^2$) | 2.4 | 1.9 | 2.3 |
| Ultimate elongation(%) | 480 | 440 | 380 |
| Secant modulus($kg/mm^2$) | 6.9 | 7.2 | 32.6 |

TABLE 2-continued

|  | COMP. EXP.1 | COMP. EXP.1-1 | COMP. EXP.2 |
|---|---|---|---|
| Post-heat-age physical properties I | | | |
| Tensile strength(kg/mm$^2$) | * | * | — |
| Ultimate elongation(%) | * | * | 0 |

* Not measurable

TABLE 3

|  | COMP. EXP.3 | COMP. EXP.4 | COMP. EXP.5 |
|---|---|---|---|
| Multifunctional monomer | | | |
| Type | TMPT | TMPT | TMPT |
| Parts by weight | 2 | 2 | 1 |
| Dose of electron beam radiation(kGy) | 100 | 100 | 50 |
| Heat-settability | ○ | X | ○ |
| Heat-shrinkability | ○ | — | ○ |
| Visible light transmission(%) | 38.6 | — | 78.5 |
| Initial physical properties | | | |
| Tensile strength(kg/mm$^2$) | 3.5 | 1.1 | 1.0 |
| Ultimate elongation(%) | 250 | 460 | 387 |
| Secant modulus(kg/mm$^2$) | 33.5 | 1.3 | — |
| Post-heat-age physical properties I | | | |
| Tensile strength(kg/mm$^2$) | 2.3 | 0.8 | 0.4 |
| Ultimate elongation(%) | 410 | 540 | 87 |

The above results demonstrate the followings.

The heat-shrinkable tubing of Comparative Example 1 was poorly crosslinked and failed to obtain an operating temperature of higher than 200° C. Its heat-shrinkability was also insufficient.

The heat-shrinkable tubing obtained in Comparative Example 1—1 by increasing the dose of electron beam radiation to 250 kGy from 100 kGy as employed in Comparative Example 1 exhibited a satisfactory heat-settability but still showed insufficient crosslinkage and heat-shrinkability as similar to those of the tubing obtained in Comparative Example 1. The specimens in Comparative Example 1—1 melted and completely lost their original shapes when placed in the Geer oven at 260° C. and their post-heat-age physical properties were not measurable.

The heat-shrinkable tubing of Comparative Example 2 which employed a different terpolymer composition from the present invention and the heat-shrinkable tubing of Comparative Example 3 which employed the bipolymer of vinylidene fluoride and tetrafluoroethylene both showed high values of secant modulus to prove their poor flexibility. Their relatively low light transmission values also indicated their poor transparency.

The heat-shrinkable tubing of Comparative Example 2 did not melt, as contrary to the heat-shrinkable tubing of Comparative Example 1, but showed an ultimate elongation of 0% after being heat-aged to prove its poor heat-aging resistance.

The heat-shrinkable tubing of Comparative Example 5 which corresponded to Example 1 of the above-mentioned Japanese Kokai Patent No. Hei 2-59325 showed an insufficient heat-aging resistance although it showed a superior heat-aging resistance to the heat-shrinkable tubing of Comparative Example 2.

In contrary to the showings of the heat-shrinkable tubings of Comparative Examples, the heat-shrinkable tubings of Examples 1–3 exhibited equally competent heat-settabilities and heat-shrinkabilities to demonstrate their ability to be used as heat-shrinkable tubings. They also exhibited relatively lower values of secant modulus and relatively higher values of visible light transmission to demonstrate their excellent flexibilities and transparencies.

In addition, each of the heat-shrinkable tubings of Examples 1–3 exhibited slight changes in physical property values between before and after being subjected to the heat-aging at 260° C. for 96 hours to demonstrate their good heat-aging resistances.

Among others, the heat-shrinkable tubing of Example 3 which contained distearylpentaerythritol-di-phosphite as an organic phosphite exhibited smaller changes in physical property values before and after being subjected to the heat-aging at 260° C. for 96 hours than the tubings of the other Examples to demonstrate its particularly good heat-aging resistance.

Example 4

A heat-shrinkable tubing of Example 4 was obtained in the similar manner as in Example 1 except added to 100 parts by weight of terpolymer as employed in Example 1 were 1 part by weight of trimethylolpropanetrimethacrylate and 0.2 parts by weight of HALS1 as a hindered amine based compound.

Example 5

A heat-shrinkable tubing of Example 5 was obtained in the similar manner as in Example 4 except 1 part by weight of triallylisocyanurate was mixed as an alternative multifunctional monomer to trimethylolpropanetrimethacrylate, the content of HALS1 as a hindered amine based compound increased to 0.4 parts by weight and the dose of the electron beam radiation increased to 100 kGy.

Example 6

A heat-shrinkable tubing of Example 6 was obtained in the similar manner as in Example 4 except the addition of trimethylolpropanetrimethacrylate was increased to 2 parts by weight and 0.3 parts by weight of HALS2 was mixed as an alternative hindered amine based compound to HALS1.

Example 7

A heat-shrinkable tubing of Example 7 was obtained in the similar manner as in Example 4 except 1 part by weight of triallylisocyanurate was mixed as an alternative multifunctional monomer to trimethylolpropanetrimethacrylate, 0.4 parts by weight of a benzotriazole compound BTAZ1 added as an alternative to HALS1 and the dose of the electron beam radiation increased to 100 kGy.

The heat-shrinkable tubings of Examples 4–7 were subjected to the above-described Heat-Settability Test, Heat-Shrinkability Test, Visible Light Transmission Test, Initial Physical Properties Tests, and the following Post-heat-age Physical Properties Tests II and III to evaluate their properties. For comparative purposes, the same Tests were performed on the heat-shrinkable tubings of Examples 1 and 3.

Post-heat-age Physical Properties Test II

Specimens prepared in the same manner as in the above Physical Properties Test were heat-aged in Geer oven maintained at 260° C. for 15 days. A tensile strength (kg/mm$^2$) and a ultimate elongation (%) were measured for each of the heat-aged specimens in the same manner as in the above Physical Properties Test.

Post-heat-age Physical Properties Test III

Specimens prepared in the same manner as in the above Physical Properties Test were heat-aged in Geer oven maintained at 260° C. for 30 days. A tensile strength (kg/mm$^2$) and a ultimate elongation (%) were measured for each of the heat-aged specimens in the same manner as in the above Physical Properties Test.

The results were given in the following Tables 4 and 5. In the Tables, TMPT and TAIC represents trimethylolpropane-trimethacrylate and triallylisocyanurate, respectively. HALS1 and HALS2, as aforementioned, represent poly[{6-1, 1, 3, 3-tetramethylbathyl} amino-1, 3, 5-triazine-2, 4-diyl}{(2, 2, 6,6-tetramethyl-4-piperidyl) imino}hexamethylene{(2, 2, 6, 6-tetramethyl-4-piperidyl) imino}], and tetrakis(2, 2, 6, 6-tetramethyl-4-piperidyl)-1, 2, 3, 4-butanetetracarboxylate, respectively.

TABLE 4

|  | EXAMPLE4 | EXAMPLE5 | EXAMPLE6 |
|---|---|---|---|
| Multifunctional monomer |  |  |  |
| Type | TMPT | TAIC | TMPT |
| Parts by weight | 1 | 1 | 2 |
| Light stabilizer |  |  |  |
| HALS1 | 0.2 | 0.4 | — |
| HALS2 | — | — | 0.3 |
| Dose of electron beam radiation(kGy) | 50 | 100 | 50 |
| Heat-settability | ◯ | ◯ | ◯ |
| Heat-shrinkability | ◯ | ◯ | ◯ |
| Visible light transmission(%) | 86.2 | 83.7 | 85.1 |
| Initial physical properties |  |  |  |
| Tensile strength(kg/mm$^2$) | 2.7 | 2.8 | 2.7 |
| Ultimate elongation(%) | 360 | 280 | 320 |
| Post-heat-age physical properties II |  |  |  |
| Tensile strength(kg/mm$^2$) | 1.5 | 1.8 | 1.6 |
| Ultimate elongation(%) | 340 | 260 | 280 |
| Post-heat-age physical properties III |  |  |  |
| Tensile strength(kg/mm$^2$) | 0.9 | 1.2 | 1.0 |
| Ultimate elongation(%) | 360 | 220 | 290 |

TABLE 5

|  | EXAMPLE7 | EXAMPLE1 | EXAMPLE3 |
|---|---|---|---|
| Multifunctional monomer |  |  |  |
| Type | TAIC | TMPT | TAIC |
| Parts by weight | 2 | 1 | 2 |
| Light stabilizer |  |  |  |
| BTAZ1 | 0.4 | — | — |
| Organic phosphite | — | — | 0.5 |
| Dose of electron beam radiation(kGy) | 100 | 50 | 100 |
| Heat-settability | ◯ | ◯ | ◯ |
| Heat-shrinkability | ◯ | ◯ | ◯ |
| Visible light transmission(%) | 84.2 | 88.6 | 88.5 |

TABLE 5-continued

|  | EXAMPLE7 | EXAMPLE1 | EXAMPLE3 |
|---|---|---|---|
| Initial physical properties |  |  |  |
| Tensile strength(kg/mm$^2$) | 2.7 | 2.8 | 2.8 |
| Ultimate elongation(%) | 310 | 420 | 390 |
| Post-heat-age physical properties II |  |  |  |
| Tensile strength(kg/mm$^2$) | 1.1 | * | 0.5 |
| Ultimate elongation(%) | 190 | * | 250 |
| Post-heat-age physical properties III |  |  |  |
| Tensile strength(kg/mm$^2$) | — | — | — |
| Ultimate elongation(%) | — | — | — |

* Not measurable

The results as shown in the Tables 4 and 5 demonstrate the followings.

The heat-shrinkable tubings of Examples 4–7 exhibited equally competent heat-settabilities and heat-shrinkabilities to demonstrate their ability to be used as heat-shrinkable tubes. They also exhibited relatively higher values of visible light transmission to demonstrate their excellent transparencies.

The results of Post-heat-age Physical Properties Test II at 260° C. for 15 days which imposed conditions more severe than Post-heat-age Physical Properties Test I indicate that the physical properties of the heat-shrinkable tubing of Example 1, in the absence of a light stabilizer and an organic phosphite, dropped so tremendously as to become unmeasurable. The heat-shrinkable tubing of Example 3 which contained the organic phosphite and the heat-shrinkable tubing of Example 7 which employed the benzotriazole compound greatly dropped their physical properties while showed better property values than the heat-shrinkable tubing of Example 1. However, the heat-shrinkable tubings of Example 4–6 which contained hindered amine based compounds exhibited smaller changes in physical property values before and after being subjected to the heat-aging to demonstrate the effectiveness of hindered amine based compounds to noticeably improve heat-aging resistances of heat-shrinkable tubings.

Next, the heat-shrinkable tubings of Examples 4–6 further experienced Post-heat-age Physical Properties Test III at 260° C. for 30 days which imposed conditions more severe than Post-heat-age Physical Properties Test II. The results thereof show that these heat-shrinkable tubings exhibited satisfactory heat-aging resistances even under such severe conditions.

Insulated Wire

Example 8

100 parts by weight of terpolymer as employed in Example 1, 4 parts by weight of trimethylolpropane-trimethacrylate and 10 parts by weight of zinc white as a vulcanization accelerator were mixed and kneaded by a known twin-roll mixer maintained at 160°–180° C. to obtain a fluororesin composition.

The fluororesin composition was then pelletized by a pelletizer to form a pellet. The pellet was melt-extruded under the extrusion temperature of 200° C., using a single screw melt-extruder (3.0 mmΦ, L/D=24), to coat a nickel-plated annealed copper conductor having an internal diameter of 0.8 mmΦ. The coated conductor was subsequently exposed to an electron beam radiation with a dose of 200 kGy and with an acceleration voltage of 2 MeV to crosslink the coating composition so that an insulated wire having an insulating coating of 0.4 mm thick was obtained as an insulated wire of Example 8.

Comparative Example 6

100 parts by weight of terpolymer as employed in Comparative Example 4 and 2 parts by weight of trimethylolpropane-trimethacrylate as a multifunctional monomer were mixed and kneaded at room temperature, using an open roll mixer, to obtain a fluororesin composition.

The insulated wire of Comparative Example 6 was obtained in the same manner as in Example 8.

The insulating coating was peeled off each of the insulated wires of Example 8 and Comparative Example 6 to prepare specimens each of 100 mm long. Each of these specimens was subjected to the above-described Initial Physical Properties Tests and the Post-heat-aging Physical Properties Tests I at 260° C. for 96 hours to measure its tensile strength (kg/mm$^2$), ultimate elongation (%) and initial secant modulus value (kg/mm$^2$).

Figure 2:
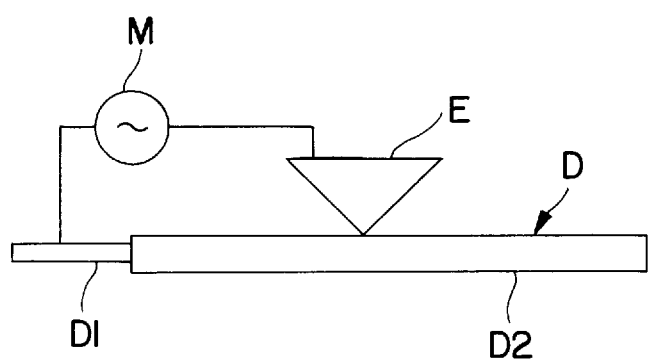
FIG. 2 is a schematic view showing a method for evaluating a tear-resistance of an insulating covering or coating for an insulated wire in accordance with the present invention.

As illustrated in FIG. 2, an electric transmission between the conductor D1 of the insulated wire D and a metal edge E (tip radius: 0.4 mmR; tip angle: 90°) was measured by means of a galvanometer M for each of the insulated wires of Example 8 and Comparative Example 6. Loads (kg) exerted upon the metal edge E and the insulated wire D were measured while the metal edge E was pressed toward the insulating coating D2 of the insulated wire D at a speed of 5 mm/minute. The loads were recorded when electricity was first transmitted between the metal edge E and the conductor D1 to evaluate tear-resistance of the insulating coating.

The results were given in the following Table 6.

TABLE 6

|  | EXAMPLE8 | COMP.EXP.6 |
| --- | --- | --- |
| Initial physical properties |  |  |
| Tensile strength(kg/mm$^2$) | 2.8 | 0.8 |
| Ultimate elongation(%) | 290 | 265 |
| Secant modulus(kg/mm$^2$) | 9.1 | 1.3 |
| Post-heat-age physical properties I |  |  |
| Tensile strength(kg/mm$^2$) | 2.8 | 0.7 |
| Ultimate elongation(%) | 270 | 241 |
| Load(kg) when electricity was first transmitted | 12 | 1.9 |

The results shown in Table 6 demonstrate that the insulating coating of the insulated wire of Example 8 had excellent heat-aging resistance, flexibility and was highly tear-resistant against an external stress.

As described above in detail, since the fluororesin composition of the present invention comprises a terpolymer having a specific composition and a multifunctional monomer as an auxiliary cross-linking agent mixed therewith in a specific proportion thereto, it has excellent heat-resistance, flexibility and heat-settability and is capable of forming a highly transparent heat-shrinkable tubing and an insulation layer or an insulating coating which exhibits excellent heat-resistance, flexibility and tear-resistance.

The fluororesin composition of the present invention which further comprises an organic phosphite or a light stabilizer as well as the above terpolymer and multifunctional monomer has a further improved heat-resistance, particularly heat-aging resistance. Among others, the fluororesin composition containing a hindered amine based compound as a light stabilizer exhibits a noticeably improved heat-aging resistance.

Since the heat-shrinkable tubing of the present invention is comprised of the above fluororesin compound, it advantageously exhibits excellent heat-resistance, flexibility and heat-settability as well as a high transparancy.

Furthermore, since the insulated wire of the present invention incorporates the insulation layer or an insulating coating made from the above fluororesin composition therearound, it is able to enjoy the advantages the insulation layer or an insulating coating possesses, i.e., excellent heat-resistance, flexibility and tear-resistance.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A fluororesin composition consisting essentially of:
   100 parts by weight of a terpolymer having three respective repetitive units of vinylidene fluoride, tetrafluoroethylene and hexafluoropropylene, said terpolymer comprising 30–50 mole % of the vinylidene fluoride, 30–50 mole % of the tetrafluoroethylene and 10–30 mole % of the hexafluoropropylene; and
   0.1–10 parts by weight of a multifunctional monomer having two or more carbon-carbon unsaturated bonds in the molecule;
   wherein said terpolymer has a melting point ranging from approximately 100° C. to 180° C. and a heat of fusion ranging from approximately −1.0 J/g to −20 J/g, and wherein said fluororesin composition is cross-linkable to produce a heat settable and heat shrinkable fluororesin.

2. A fluororesin composition of claim 1 wherein:
   said terpolymer has a molecular weight to provide a melt flow property of about 0.1–30.

3. A fluororesin composition of claim 1 wherein:
   said multifunctional monomer is selected from the group consisting of trimethylolpropanetrimethacrylate, triallylisocyanurate, triallylcyanurate, ethyleneglycoldimethacrylate, tetramethylolpropanetetraacrylate, and mixtures thereof.

4. A fluororesin composition of claim 3 wherein:
   said composition includes about 1–10 parts by weight of said multifunctional monomer.

5. A fluororesin composition consisting essentially of:
   100 parts by weight of a terpolymer having three respective repetitive units of vinylidene fluoride, tetrafluoroethylene and hexafluoropropylene, said terpolymer comprising 30–50 mole % of the vinylidene fluoride, 30–50 mole % of the tetrafluoroethylene and 10–30 mole % of the hexafluoropropylene;
   0.1–10 parts by weight of a multifunctional monomer having two or more carbon-carbon unsaturated bonds in the molecule; and
   0.1–1.0 parts by weight of an organic phosphite;
   wherein said terpolymer has a melting point ranging from approximately 100° C. to 180° C. and a heat of fusion ranging from approximately −1.0 J/g to −20 J/g, and wherein said composition is cross-linkable to produce a heat settable and heat shrinkable fluororesin.

6. A fluororesin composition of claim 5 wherein:
said organic phosphite is selected from the group consisting of distearylpentaerythritol-di-phosphite, bis (2, 6-di-tert-butyl-4-methylphenyl)pentaerythritol-di-phosphite and bis(2, 6-di-tert-butyl-4-phenyl) pentaerythritol-di-phosphite.

7. A fluororesin composition consisting essentially of:
100 parts by weight of a terpolymer having three respective repetitive units of vinylidene fluoride, tetrafluoroethylene and hexafluoropropylene, said terpolymer comprising 30–50 mole % of the vinylidene fluoride, 30–50 mole % of the tetrafluoroethylene and 10–30 mole % of the hexafluoropropylene;
0.1–10 parts by weight of a multifunctional monomer having two or more carbon-carbon unsaturated bonds in the molecule; and
a light stabilizer;
wherein said terpolymer has a melting point ranging from approximately 100° C. to 180° C. and a heat of fusion ranging from approximately −1.0 J/g to −20 J/g, and wherein said composition is cross-linkable to produce a heat settable and heat shrinkable fluororesin.

8. A fluororesin composition of claim 7 wherein:
said light stabilizer is a hindered amine based compound.

9. A fluororesin composition of claim 7 wherein:
said light stabilizer is selected from the group consisting of poly[{6-(1, 1, 3, 3-tetramethylbutyl)amino-1, 3,5-triazine-2, 4-diyl}{2, 2, 6, 6-tetramethyl-4-piperidyl)imino}hexamethylene{(2, 2, 6, 6-tetramethyl-4-piperidyl)imino}], tetrakis(2, 2, 6, 6-tetramethyl-4-piperidyl)-1, 2, 3, 4-butanetetracarboxylate, 2, 2-dihydroxy-4-methoxy-benzophenone, 2, 2-methylene-bis[4-(1, 1, 3, 3-tetramethylbutyl)-6-(2H-benzotriazole-2-yl)phenol], and 2-ethoxy-2-ethyl-oxalic acid bisanilide.

10. A fluororesin composition consisting essentially of:
100 parts by weight of a terpolymer having three respective repetitive units of vinylidene fluoride, tetrafluoroethylene and hexafluoropropylene, said terpolymer comprising 30–50 mole % of the vinylidene fluoride, 30–50 mole % of the tetrafluoroethylene and 10–30 mole % of the hexafluoropropylene; and
0.1–10 parts by weight of a multifunctional monomer having two or more carbon-carbon unsaturated bonds in the molecule; and
a vulcanizing accelerator;
wherein said terpolymer has a melting point ranging from approximately 100° C. to 180° C. and a heat of fusion ranging from approximately −1.0 J/g to −20 J/g, wherein said composition is cross-linkable to produce a heat settable and heat shrinkable fluororesin.

11. The fluororesin composition of claim 10 wherein said vulcanizing accelerator is zinc oxide.

12. A fluororesin composition consisting essentially of:
100 parts by weight of a terpolymer having three respective repetitive units of vinylidene fluoride, tetrafluoroethylene and hexafluoropropylene, said terpolymer comprising 30–50 mole % of the vinylidene fluoride, 30–50 mole % of the tetrafluoroethylene and 10–30 mole % of the hexafluoropropylene;
0.1–10 parts by weight of a multifunctional monomer having two or more carbon-carbon unsaturated bonds in the molecule; and
a hydrofluoric acid scavenger;
wherein said terpolymer has a melting point ranging from approximately 100° C. to 180° C. and a heat of fusion ranging from approximately −1.0 J/g to −20 J/g, wherein said composition is cross-linkable to produce a heat settable and heat shrinkable fluororesin.

13. The fluororesin composition of claim 12, wherein said hydrofluoric acid scavenger is selected from the group consisting of magnesium oxide and calcium hydroxide.

14. A fluororesin composition consisting essentially of:
100 parts by weight of a terpolymer having three respective repetitive units of vinylidene fluoride, tetrafluoroethylene and hexafluoropropylene, said terpolymer comprising 30–50 mole % of the vinylidene fluoride, 30–50 mole % of the tetrafluoroethylene and 10–30 mole % of the hexafluoropropylene; and
0.1–10 parts by weight of a multifunctional monomer having two or more carbon-carbon unsaturated bonds in the molecule;
a vulcanizing accelerator; and
a hydrofluoric acid scavenger;
wherein said terpolymer has a melting point ranging from approximately 100° C. to 180° C. and a heat of fusion ranging from approximately −1.0 J/g to −20 J/g, and wherein said composition is cross-linkable to produce a heat settable and heat shrinkable fluororesin.

15. A fluororesin composition comprising:
100 parts by weight of a terpolymer having three respective repetitive units of vinylidene fluoride, tetrafluoroethylene and hexafluoropropylene, said terpolymer comprising 40 mole % of the vinylidene fluoride, 40 mole % of the tetrafluoroethylene and 20 mole % of the hexafluoropropylene; and
0.1–10 parts by weight of a multifunctional monomer having two or more carbon-carbon unsaturated bonds in the molecule;
wherein said terpolymer has a melting point ranging from approximately 100° C. to 180° C. and a heat of fusion ranging from approximately −1.0 J/g to −20 J/g, and wherein said composition is cross-linkable to produce a heat settable and heat shrinkable fluororesin.

16. The fluororesin composition of claim 15 further comprising an organic phosphite selected from the group consisting of distearylpentaerythritol-di-phosphite, bis(2, 6-di-tert-butyl-4-methylphenyl)pentaerythritol-di-phosphite and bis(2, 6-di-tert-butyl-4-phenyl) pentaerythritol-di-phosphite.

17. The fluororesin composition of claim 15 further comprising a light stabilizer selected from the group consisting of poly[{6-(1, 1, 3, 3-tetramethylbutyl)amino-1, 3,5-triazine-2, 4-diyl}{2, 2, 6, 6-tetramethyl-4-piperidyl)imino}hexamethylene{(2, 2, 6, 6-tetramethyl-4-piperidyl)imino}], tetrakis(2, 2, 6, 6-tetramethyl-4-piperidyl)-1, 2, 3, 4-butanetetracarboxylate 2, 2-dihydroxy-4-methyl-benzophenone, 2, 2'-methylene-bis[4-(1, 1, 3, 3-tetramethylbutyl)-6-(2H-benzotriazole-2-yl)phenol], and 2-ethoxy-2-ethyl-oxalic acid bisanilide.

18. The fluororesin composition of claim 15 further comprising a vulcanizing accelerator.

19. The fluororesin composition of claim 18 wherein said vulcanizing accelerator is zinc oxide.

20. The fluororesin composition of claim 18 further comprising a hydrofluoric acid scavenger.

21. The fluororesin composition of claim 15 further comprising a hydrofluoric acid scavenger.

22. The fluororesin composition of claim 21 wherein said hydrofluoric acid scavenger is magnesium oxide or calcium hydroxide.

* * * * *